Sept. 5, 1967  J. LINDNER  3,340,452
ELECTRIC MOTOR WITH AUTOMATIC SPEED CONTROL BY CENTRIFUGAL MEANS
Filed Dec. 5, 1963  4 Sheets-Sheet 1
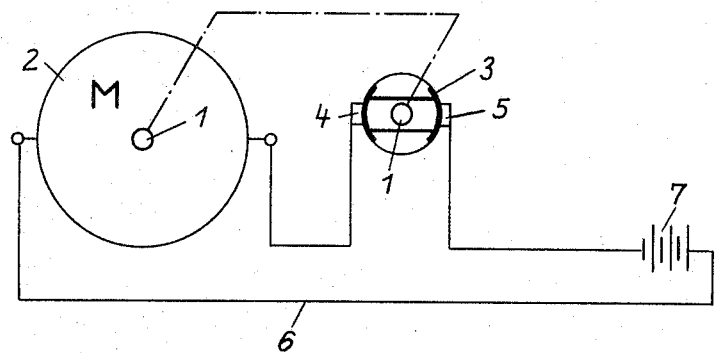
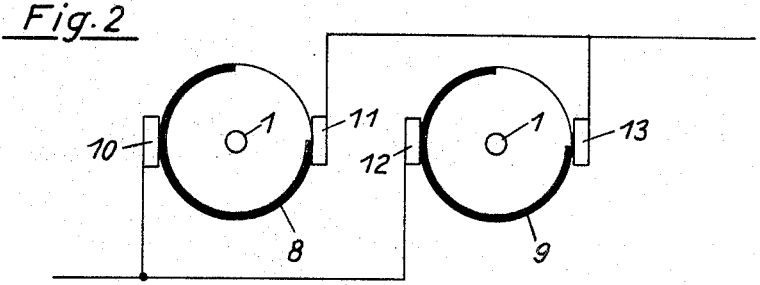
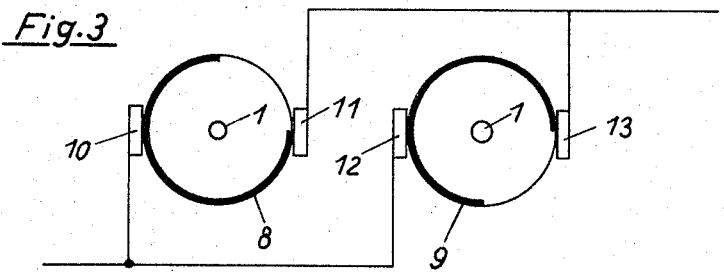
INVENTOR:
JOSEF LINDNER Sept. 5, 1967   J. LINDNER   3,340,452
ELECTRIC MOTOR WITH AUTOMATIC SPEED CONTROL BY CENTRIFUGAL MEANS
Filed Dec. 5, 1963   4 Sheets-Sheet 2
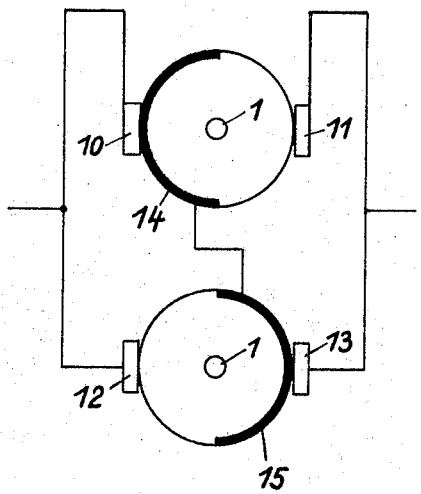
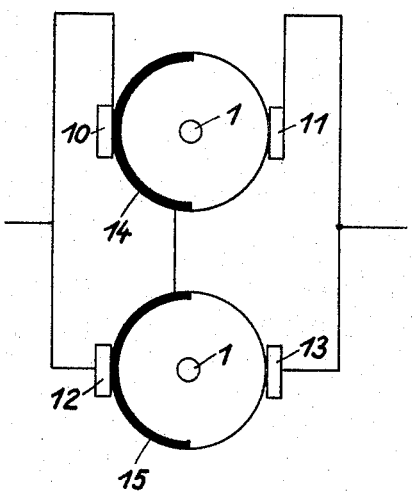
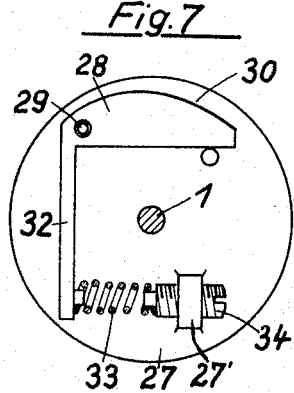
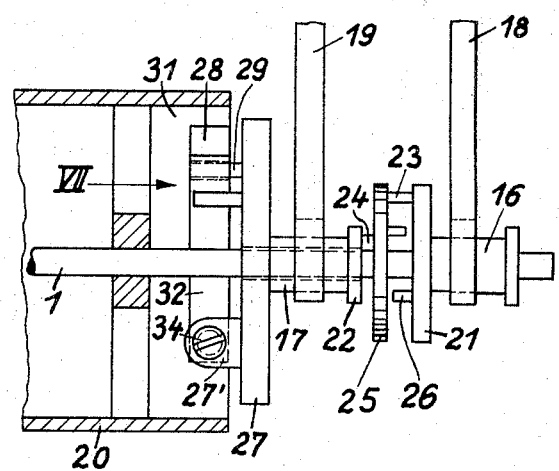
INVENTOR:
JOSEF LINDNER

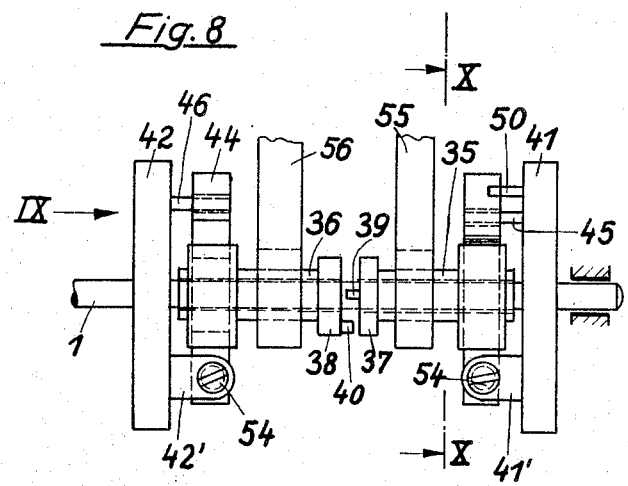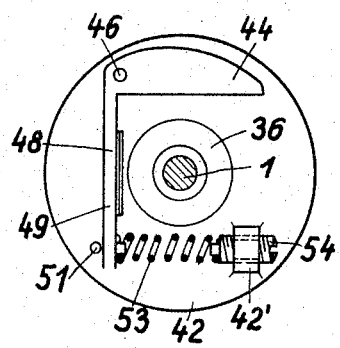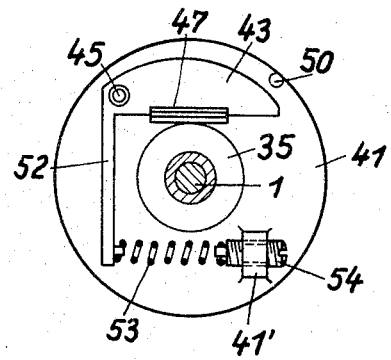

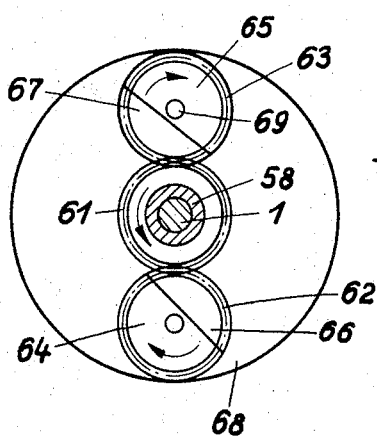
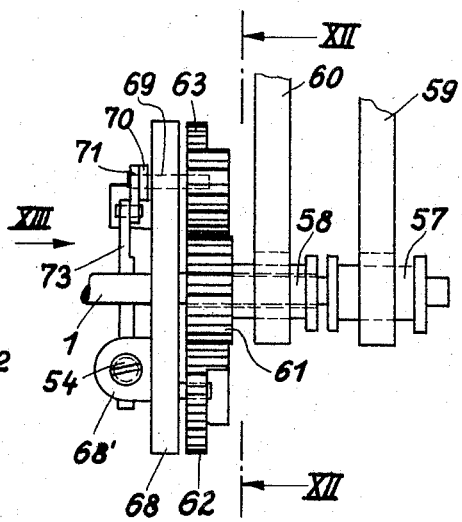
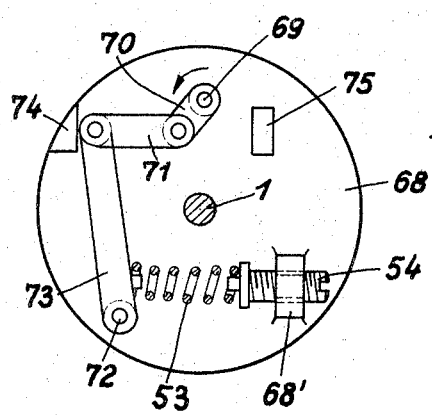

United States Patent Office 3,340,452
Patented Sept. 5, 1967

3,340,452
ELECTRIC MOTOR WITH AUTOMATIC SPEED CONTROL BY CENTRIFUGAL MEANS
Josef Lindner, Nurnberg, Germany, assignor to Firma Paul Weiss, Inh. Ernst Weiss, Nurnberg, Germany, a German firm
Filed Dec. 5, 1963, Ser. No. 328,236
Claims priority, application Germany, Dec. 13, 1962, W 33,513
14 Claims. (Cl. 318—325)

The present invention relates to an electric motor, and more particularly to a motor of a minature size, which is provided with an automatic speed control by means of at least one centrifugal weight, for interrupting the motor circuit.

The electric motors of this type as are already known are designed so that, when the rated speed of the motor is reached, the centrifugal weight opens a switch which interrupts the circuit of the motor so that the motor is no longer supplied with current and consequently its speed decreases, whereupon the switch is again closed so that the speed again increases. The result of the centrifugal switch is therefore that at a higher speed of the motor which may be caused, for example, by an increase in voltage, the motor will receive a current which is interrupted from time to time and has an effective value substantially equal to the current which is supplied to the motor when the latter is running at the rated speed. If the motor is a direct-current motor, it is supplied, for example, with an intermittent direct current which is usually interrupted approximately 3 to 5 times during each revolution of the motor shaft. If the motor is supplied with a voltage which is just sufficient to attain the desired speed, the off-time $ta$ is zero, while the ontime $te$ is equal to the total running time of the motor and therefore the ration $te/ta=\infty$. If the voltage increases, the ratio $te/ta$ continuously decreases since $te$ becomes smaller, while $ta$ becomes larger. In principle, the effective value of the current supplied to a motor with an automatic speed control by means of a centrifugal switch is therefore controlled in such a manner that the desired rated speed will be automatically maintained.

These known electric motors with a speed control by means of a centrifugal switch have, however, the great disadvantage that particularly at the desired rated speed of the motor that contacts of the centrifugal switch engage very loosely with each other so that the current may not always pass properly through these contacts. If these contacts become only very slightly soiled by dusty or moist air or by oxidation, the contact resistance on the contacts of the centrifugal switch will increase and thereby render the passage of the current more difficult.

It is an object of the present invention to provide a speed-controlled electric motor of the above-mentioned type which overcomes these contacts difficulties. For attaining this object, the invention provides that the motor shaft, or a part driven thereby, carries two slip rings having contact segments which are connected into the motor circuit by means of brushes and serve for interrupting the motor circuit, and one of which slip rings is angularly displaceable relative to the other by the action of centrifugal force responsive means, such as the centrifugal action of a flyweight. The brushes then engage at a normal adjustable contact pressure with the slip rings so that all contact difficulties are positively prevented, especially since the brushes and contact segments clean themselves as the result of the friction occurring during rotation. When the motor runs up to the rated speed, the contact segments are associated with each other in such a manner that the motor will always receive the full uninterrupted current. The mentioned ratio $te/ta$ is therefore $\infty$. When the motor reaches the rated speed, the centrifugal action of the flyweight becomes effective and causes one of the contact segments to be angularly displaced relative to the other so that the motor current is interrupted and the ratio of $te/ta$ decreases. Of course, due to the action of the flyweight, a state of balance will then occur in which the effective current which is supplied to the motor becomes equal to the current which is necessary for driving the motor at the rated speed. The brushes of the two contact segments are then connected in parallel. The two contact segments may have a contact angle of, for example, 270°, in which case the relative displacement angle amounts to 90°, or the contact angle may amount to 180° in which case the relative displacement angle amounts to 180°. By angularly displacing the movable contact segment from 0° to the maximum angle, the ratio $te/ta$ may be changed from $\infty$ to 1 which is in most cases sufficient, or it may be changed to 0.

According to a modification and further development of the invention, one slip ring may be rigidly secured to the motor shaft and be connected by a spring to the other slip ring which is loosely mounted on the motor shaft and rigidly connected to a disk which is provided with a flyweight which engages upon a brake drum when the rated speed of the motor is reached. When this occurs, the flyweight, together with the disk which is rigidly connected to the loose slip ring is braked and thereby retarded through a certain angle against the action of the mentioned spring, which is preferably a spiral spring.

The braking force and the force of the spiral spring are in balance when the motor is supplied through the two contact segments with a current which corresponds to the effective value which is required for the rotation of the motor at its rated speed. For limiting the extent of the angular displacement of one contact segment relative to the other, both slip rings are provided with stops. In order to permit the motor according to the invention to be accurately adjusted to the rated speed, a setscrew is provided whereby the initial tension of a spring which opposes the centrifugal force of the respective flyweight may be adjusted.

According to another feature of the invention, both slip rings may be loosely mounted on the motor shaft, while their relative displacement angle is likewise limited by the associated stops. Aside from the two slip rings, the motor shaft also carries rigidly thereon a pair of disks each of which is provided with a flyweight. When the motor runs at a speed below the rated speed, the flyweight of one disk engages upon the associated slip ring, whereby this slip ring is taken along, whereas the flyweight of the other disk does not engage with and take along the other slip ring until the motor has reached the rated speed. The last-mentioned flyweight, which does not become effective until the rated speed of the motor is reached, is provided with a substantially perpendicular arm which engages with the other slip ring. In the operation of the motor at speeds below the rated speed, only one disk takes along the associated slip ring. This contact segment, in turn, takes along the other slip ring since both rings are connected to each other by stops which limit their relative displacement angle. When the two contact segments are in this position, the motor current is switched on continuously so that the ratio $te/ta$ then amounts to $\infty$. Due to the high effective value of the current, the speed then increases up to the rated speed. As soon as the rated speed is reached, the other slip ring is also connected by its flyweight to the associated disk. This does not as yet change the ratio $te/ta$, and therefore the speed further increases until the centrifugal action of the flyweight of the first disk becomes effective and this flyweight disengages from the associated slip ring which is then decelerated by the associated pair of brushes. This results in a rotation of this contact segment relative to the other segment so that the ratio $te/ta$ is reduced until the speed has dropped so far that the flyweight of the first disk again engages with the associated slip ring. In this condition, which occurs automatically, the motor receives the effective value of the current which it requires to maintain its rated speed.

According to another embodiment of the invention, one of the two slip rings may be rigidly secured to the motor shaft, while the other ring is loosely mounted thereon. Adjacent to the loose ring, the motor shaft carries rigidly thereon a disk on which, at diametrically opposite points which are equally spaced from the center, a pair of gears of equal size are rotatably mounted, are provided with flyweights and are rotatable by the action of the centrifugal forces against the action of springs. These gears are in engagement with a gear which is rigidly connected to the associated slip ring. These gears may be provided with segmentally shaped recesses whereby projecting parts are formed on the gears, and which serve as flyweights to produce centrifugal forces. Actually only one gear needs to be thus provided, since the second gear merely serves for counterbalancing the first gear. When the motor reaches its rated speed, the centrifugal forces of the flyweights on the gears become effective and turn the slip ring which is loosely mounted on the motor shaft in a direction in which the ratio $te/ta$ decreases. Also in this case a stable condition will occur automatically in which the rated speed of the motor will be maintained. For compensating the centrifugal forces of the flyweights, a lever system is provided on the side of the disk opposite to the gears. This lever system is connected to the shaft of one of the gears, which extends through the disk, and it is acted upon by a spring which opposes the action of the centrifugal forces and the initial tension of which is adjustable by means of a setscrew. By a proper adjustment of this setscrew it is possible to adjust the rated speed of the motor very accurately.

The disk may be provided with a pair of stops for one of the levers of the lever system which is rigidly connected to the shaft of the gear wheel. These stops limit the extent of the swiveling movement of the slip ring which is loosely mounted on the motor shaft.

The above-mentioned as well as additional features and advantages of the present invention will become more clearly apparent from the following detailed description thereof which is to be read with reference to the accompanying drawings, in which—

FIGURE 1 shows a circuit diagram of an electric motor according to the invention;

FIGURE 2 shows diagrammatically two contact segments in a position relative to each other in which the ratio $te/ta$ equals 1;

FIGURE 3 shows the same arrangement as that of FIGURE 2, in which, however, the right contact segment is turned through an angle of 90° in the clockwise direction so that the ratio $te/ta$ is $\infty$;

FIGURE 4 shows two contact segments, in a position relative to each other in which the ratio $te/ta$ is $\infty$;

FIGURE 5 shows the same arrangement as that of FIGURE 4, in which, however, the lower contact segment is turned at an angle of 180° relative to the upper segment and in which the ratio $te/ta$ equals 0;

FIGURE 6 shows a partial section of the area adjacent to the two contact segments of the motor according to the invention;

FIGURE 7 shows a view which is taken in the direction of the arrow VII in FIGURE 6;

FIGURE 8 shows an elevation of the area adjacent to the contact segments of a modification of the motor according to the invention;

FIGURE 9 shows a view which is taken in the direction of the arrow IX in FIGURE 8;

FIGURE 10 shows a cross section which is taken along the line X—X of FIGURE 8;

FIGURE 11 shows an elevation of the area adjacent to the contact segments of a further modification of the motor according to the invention;

FIGURE 12 shows a cross section which is taken along the line XII—XII of FIGURE 11; while FIGURE 13 shows a view which is taken in the direction of the arrow XIII in FIGURE 11.

In FIGURE 1 it is illustrated diagrammatically that a contact segment means 3, which is substantially of a double-T shape and may form part of a slip ring, is secured to the shaft 1 of the electric motor 2 and connected to the circuit 6 of the motor through the brushes 4 and 5. By the action of the contact segment 3, the electric motor 2 is supplied, from a direct current source 7, with an intermittent direct current the effective value of which is equal to the current which is required for driving the motor 2 at the desired rated speed. In order to control the current to maintain the rated speed at a constant value, two contact segments 8 and 9, as illustrated diagrammatically in FIGURES 2 and 3, are mounted on and insulated from the motor shaft 1. These contact segments 8 and 9 are connected into the circuit of motor 2 by means of the brushes 10 and 13. One of the contact segments, for example, the segment 9, may be turned relative to the other contact segment 8 through an angle of 90°. In the position of the two contact segments 8 and 9 as shown in FIGURE 2, the ratio of the on-time $te$ to the off-time $ta$ equals 1 since $te=ta=\pi$. In the position of the contact segments as shown in FIGURE 3, the right contact segment 9 is turned relative to the left segment 9 at an angle of 90° in the clockwise direction. In this position of the two contact segments 8 and 9 the ratio $te/ta=\infty$.

Whereas the contact segments 8 and 9 according to FIGURES 2 and 3 have a contact angle or arcuate extent of 270°, the contact segments 14 and 15 according to FIGURES 4 and 5 have a contact angle or arcuate extent of 180°. The displacement angle likewise amounts to 180°. In the position according to FIGURE 4, the ratio $te/ta=\infty$ since $ta=0$. In the position according to FIGURE 5, in which the lower contact segment 15 is turned relative to the upper contact segment 14 through an angle of 180°, the ratio $te/ta=0$ since $te=0$.

In the further embodiment of the invention, as illustrated in FIGURE 6, the motor shaft 1 carries two slip rings mounting contact segments, namely, the contact segment ring 16 which is rigidly secured to the shaft and the contact segment ring 17 which is loosely slidable on the shaft. Two pairs of brushes 18 and 19 engage with the two contact segment rings 16 and 17, respectively, and are connected into the circuit of the electric motor which has a cylindrical housing 20. Each contact segment ring 16 and 17 has a flange 21 or 22, respectively, which is provided with a pin 23 or 24 extending perpendicularly therefrom, and which are connected to each other by a spiral spring 25. Pin 24 also serves as a stop and is adapted to engage with a stop pin 26 which is secured to the flange 21. These stop pins 24 and 26 limit the extent of the turning movement of the loose contact segment ring 17 to an angle of 180°.

Contact segment ring 17 is rigidly connected to a disk 27 on which a flyweight 28 is pivotably mounted at 29, as shown particularly in FIGURE 7. This flyweight 28 has a brake surface 30 which is adapted to engage with the cylindrical inner wall 31 of the motor housing 20. Flyweight 28 is further provided with an arm 32 extending perpendicularly thereto, that is, in the downward direction in FIGURE 7. The free end of arm 32 is acted upon by a compression spring 33 the other end of which rests on a setscrew 34 which is screwed into a projection 27' on disk 27 and permits the initial tension of spring 33, and thereby also the rated speed of the electric motor, to be adjusted. Before the motor reaches its rated speed, flyweight 28 is held in the position as shown in FIGURE 7, in which the contact segment rings 16 and 17 are disposed in such a position to each other that the ratio $te/ta = \infty$.

When the motor reaches its rated speed, flyweight 28 pivots about pin 29 in the counterclockwise direction, as viewed in FIGURE 7, and its brake surface 30 engages upon the cylindrical inner wall 31 of housing 20. Disk 27 which is rigidly connected to the contact segment ring 17 is thereby slowed down and contact segment ring 17 is turned relative to contact segment ring 16 against the action of the spiral spring 25 until a state of balance is reached in which the braking force is equal to the force of the spiral spring 25, at which time the motor runs at its rated speed.

According to the further modification of the invention as illustrated in FIGURE 8, the two contact segment rings 35 and 36 are loosely mounted on the motor shaft 1. Both rings 35 and 36 have flanges 37 and 38, respectively, which carry stop pins 39 and 40 which limit the extent of the relative angular displacement of the two segments to 90°. Shaft 1 has two disks 41 and 42 rigidly secured thereto on which flyweights 43 and 44 are pivotably mounted at 45 and 46, respectively. By means of friction surfaces 47 and 48, flyweight 43 and the vertically projecting arm 49 of flyweight 44 are adapted to engage upon the contact segment rings 35 and 36, respectively. The extent of the swiveling movements of flyweights 43 and 44 is limited by the stop pins 50 and 51 on disks 41 and 42, respectively. Arms 49 and 52 of flyweights 44 and 43 are acted upon by compression springs 53 the other ends of which rest on setscrews 54 which are screwed into the projections 41' and 42' on disks 41 and 42, respectively, and permit the initial tension of springs 53 and thereby also the rated speed of the motor to be adjusted.

Two pairs of brushes 55 and 56 engage with the two contact segment rings 35 and 36. When the motor runs at speeds below the rated speed, the compression spring 53 presses the friction surface 47 against the contact segment ring 35 so that the latter will be taken along by disk 41. By the engagement of stop pins 39 and 40, contact segment ring 36 is also taken along since the friction surface 48 on arm 49 of flyweight 44 does not engage with contact segment ring 36. In this position the rato $te/ta = \infty$ and the electric motor is supplied with the full current. When the motor reaches its rated speed, flyweight 44 swivels in the counterclockwise direction, as viewed in FIGURE 9, and against the action of the compression spring 53 with the result that the friction surface 48 on the arm 49 of flyweight 44 engages upon the contact segment ring 36 and takes along the latter. At the same time, the friction surface 47 of flyweight 43 disengages from contact segment ring 35 against the action of the compression spring 53. Contact segment ring 35 on motor shaft 1 is therefore released and retarded merely by the brushes 55 relative to the other contact segment ring 36. This relative rotation of the two contact segment rings 35 and 36 has the result that the ration $te/ta$ decreases which means that the effective current also decreases and thus also the speed until the friction surface 47 on flyweight 43 again engages upon the contact segment ring 35. In this condition, which occurs automatically, the motor receives the effective value of the current which is required for maintaining the desired rated speed. When the torque or the voltage changes, a readjustment occurs automatically.

According to the further modification of the invention as illustrated in FIGURE 11, the motor shaft 1 has a contact segment 57 rigidly secured thereto and a contact segment ring 58 loosely mounted thereon. The motor current is supplied to these contact segments by means of two pairs of brushes 59 and 60. The loose contact segment 58 is rigidly connected to a gear 61 which engages with two other gears 62 and 63 which are provided with segmentally shaped recesses 64 and 65 resulting on the remainder of the gears in projections 66 and 67 which serve as flyweights. Gears 62 and 63 are rotatably mounted on a disk 68 which is rigidly secured to the motor shaft 1. Gear 63 is rigidly secured on a shaft 69 which is rotatably mounted in disk 68 and carries on the other side of the latter a lever 70 which is rigidly secured to shaft 69 and connected by means of a link 71 to a lever 73 which is pivotably mounted at 72. The extent of the movement of lever 70 and thus also of gears 62 and 63 is limited by stops 74 and 75 on disk 68. Lever 73 is acted upon by a compression spring 53 which rests with its other end on a setscrew 54. This setscrew 54 which is screwed into a projection 68' on disk 68 permits the initial tension of spring 53 and thereby the desired rated speed of the motor to be adjusted.

When the motor runs at a speed below its rated speed, all parts as described are in the positions as illustrated in FIGURES 11 to 13 in which the two contact segment rings 57 and 58 are disposed in such a position relative to each other that the ratio $te/ta = \infty$. This ratio does not change until the rated speed is reached. If the rated speed amounts, for example, to 3000 r.p.m. and the highest permissible speed is 3090 r.p.m., the loose contact segment ring 58 must be turned at this maximum speed relative to the fixed contact segment ring 57 in such a manner that the ratio $te/ta = 1$.

When the motor exceeds its rated speed, flyweights 66 and 67 become effective and turn the gears 62 and 63 according to FIGURE 12 so far in the clockwise direction until the centrifugal forces and the force of spring 53 balance each other. This turning of gears 62 and 63 is transmitted by gear 61 to the loose contact segment ring 58 which is thereby turned relative to the contact segment ring 57 which is rigidly secured to shaft 1, so that the motor will be supplied with a lower effective current. When the loose contact segment ring 58 is in a certain position relative to the fixed contact segment ring 57, the condition is automatically attained in which the effective current is adjusted to the value which is required for maintaining the desired rated speed of the motor.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In an electric motor having a shaft, an electric motor circuit, and means for automatically controlling the speed of said motor, the improvement in which said means comprises, in combination, a pair of rotary switches included in the motor circuit and conjointly controlling the supply of current to the motor; each rotary switch including a slip ring, having a contact segment of a predetermined arcuate extent, and a pair of brushes engaged with the slip ring; said two slip rings being mounted on said shaft for rotation therewith and for angular displacement of their contact segments relative to each other; said slip rings, when the contact segments thereof are in one angular position relative to each other, conjointly maintaining the motor circuit closed during rotation of the shaft; and at least one centrifugal force responsive means mounted on and rotated by said shaft, and operatively connected to at least one of said slip rings to effect speed-responsive angular displacement of said slip rings relative to each other; said centrifugal force responsive means, when the speed of the motor at least attains a preselected rated speed, effecting an angular displacement of said contact segments relative to each other to an extent sufficient to interrupt the motor circuit for a time, during each revolutionary of said shaft, sufficient to maintain the average motor current at a value to maintain said preselected rated speed.

2. An electric motor as defined in claim 1 in which said brushes for said two contact segments are connected in parallel.

3. An electric motor as defined in claim 1, in which said two contact segments have a contact angle of 270° and a relative swivel angle of 90°.

4. An electric motor as defined in claim 1, in which said two contact segments have a contact angle of 180° and a relative swivel angle of 180°.

5. An electric motor as defined in claim 1, in which one of said slip rings is rigidly secured to said motor shaft and the other slip ring is loosely mounted on said shaft, and further comprising spring means connecting said slip rings to each other, a disk-shaped member rigidly connected to said loose slip ring, said centrifugal force responsive means comprising flyweight pivotably mounted on said disk-shaped member, and a stationary brake drum surrounding said disk-shaped member, said flyweight engaging with said brake drum when said motor reaches its rated speed.

6. An electric motor as defined in claim 5, in which said spring means comprises a spiral spring connected at its opposite ends to said slip rings.

7. An electric motor as defined in claim 5, further comprising stop members limiting the relative angular displacement of said slip rings.

8. An electric motor as defined in claim 5, further comprising spring means acting upon said flyweight in the direction opposite to the centrifugal force produced by said flyweight, and means operable to adjust the initial tension of said last spring means.

9. An electric motor as defined in claim 1, in which said centrifugal force responsive means comprises a pair of flyweights, and in which both of said slip rings are loosely mounted on said motor shaft, and further comprising stop members on each of said slip rings limiting their relative angular displacement, a pair of disk-shaped members secured to said shaft and operatively each adjacent to and associated with a respective one of said slip rings and each operatively associated with a respective one of said flyweights, means pivotably connecting said flyweights to their associated disk-shaped members, said flyweight on the first of said disk-shaped members engaging upon and taking along the associated slip ring when said motor is running at a speed below its rated speed, said flyweight on the second disk-shaped member engaging upon and taking along the other slip ring after said motor reaches its rated speed.

10. An electric motor as defined in claim 9, further comprising an arm secured to and extending substantially perpendicularly from said flyweight on said second disk-shaped member and engaging with said other slip ring after said motor reaches its rated speed.

11. An electric motor as defined in claim 1, in which said centrifugal force responsive means comprises a pair of flyweights, and in which one of said slip rings is rigidly secured to said motor shaft and the other slip ring is loosely mounted on said shaft, and further comprising a disk-shaped member rigidly secured to said shaft adjacent to said loose slip ring, gear means of equal size rotatably mounted on said disk-shaped member at diametrically opposite points and at equal distances from the center of said disk-shaped member, each of said flyweights being secured to a respective one of said gear means and disposed eccentrically thereto, said gear means being turned in one direction by the centrifugal force produced by said flyweights thereon, spring means acting upon said gear means in the opposite direction, and a gear member in mesh with said gear means and rigidly secured to said loose contact segment.

12. An electric motor as defined in claim 11, in which said gear means comprises gear wheels having segmentally shaped projections thereon forming said flyweights.

13. An electric motor as defined in claim 11, in which said gear means comprise gear wheels rotatably mounted at one side of said disk-shaped member, one of said gear wheels having a shaft rigidly secured thereto and rotatably mounted in and extending through said disk-shaped member to the other side thereof, lever means connected to said gear wheel shaft at said other side, said spring means acting upon said lever means, and means operable to adjust the initial tension of said spring means.

14. An electric motor as defined in claim 13, further comprising a pair of stationary stop members limiting the pivoting movement of said lever means and thus also the extent of the rotation of said gear wheels.

References Cited

UNITED STATES PATENTS

| 1,874,094 | 8/1932 | Ford et al. | 318—19 |
| 3,045,158 | 7/1962 | Reinsch | 318—325 X |

ORIS L. RADER, *Primary Examiner.*

T. LYNCH, *Assistant Examiner.*